United States Patent
Hooley

[11] Patent Number: 4,465,290
[45] Date of Patent: Aug. 14, 1984

[54] SHOPPING CART WITH LOWER TRAY SIGNALLING DEVICE

[76] Inventor: Charles M. Hooley, 920 S. Greeley St., Stillwater, Minn. 55082

[21] Appl. No.: 365,180

[22] Filed: Apr. 5, 1982

[51] Int. Cl.³ .............................................. B62B 11/00
[52] U.S. Cl. ............................... 280/33.99 A; 116/200; 177/140; 280/33.99 H
[58] Field of Search ................. 280/33.99 A, 33.99 H; 177/45, 46, 140, 177; 116/200, 215, 282, 283

[56] References Cited

U.S. PATENT DOCUMENTS

| | | | |
|---|---|---|---|
| 616,055 | 12/1898 | Eaton | 116/303 |
| 1,672,089 | 6/1928 | Reid | 116/282 |
| 1,762,384 | 6/1930 | Bow | 116/215 |
| 2,430,927 | 11/1947 | Goodwin | 116/283 |
| 2,479,530 | 8/1949 | Watson | 280/33.99 R |
| 2,590,048 | 3/1952 | Sides | 280/33.99 R |
| 2,670,194 | 2/1954 | Hansson | 177/45 |
| 2,687,589 | 8/1954 | Brockway | 280/33.99 A |
| 2,738,201 | 3/1956 | Spears | 280/33.99 A |
| 2,812,187 | 11/1957 | Nicholl | 280/33.99 R |
| 2,903,269 | 8/1959 | Hennion | 280/33.99 A |
| 2,918,294 | 12/1959 | Hennion | 280/33.99 A |
| 3,051,936 | 8/1962 | Finger | 280/33.99 A |
| 3,931,984 | 1/1976 | Young | 280/33.99 C |
| 4,382,478 | 5/1983 | Hearn | 177/225 |

FOREIGN PATENT DOCUMENTS 12095  1/1903  Austria ............................... 177/140

Primary Examiner—David M. Mitchell
Attorney, Agent, or Firm—Dorsey & Whitney

[57] ABSTRACT

A shopping cart with a signalling device for indicating the presence of a load on the lower tray. The signalling device includes an elongated rigid member connected between the lower tray and the shopping cart basket, a second member secured to the basket with a portion slideably connected with the upper end of the rigid member. Either the rigid member or the second member includes a signal portion which when exposed, indicates the presence of a load on the lower tray. The signalling device also includes means for maintaining the lower tray in an upper position in the absence of a load and for permitting movement to a lower position when a load is placed on the lower tray.

10 Claims, 6 Drawing Figures

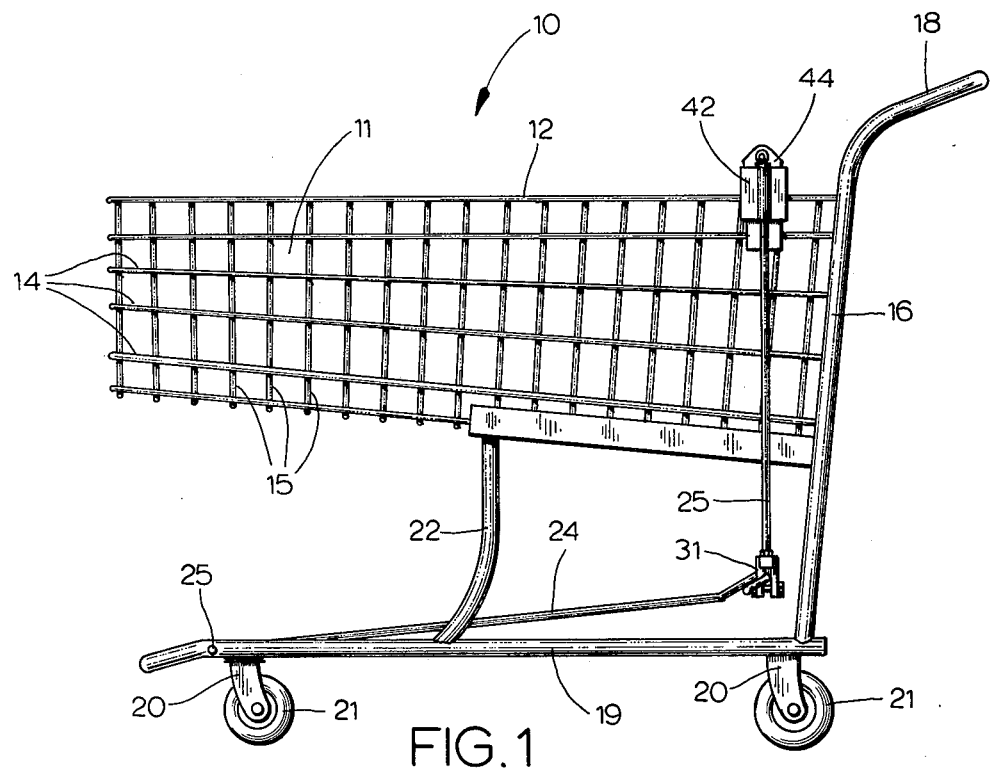
FIG. 1
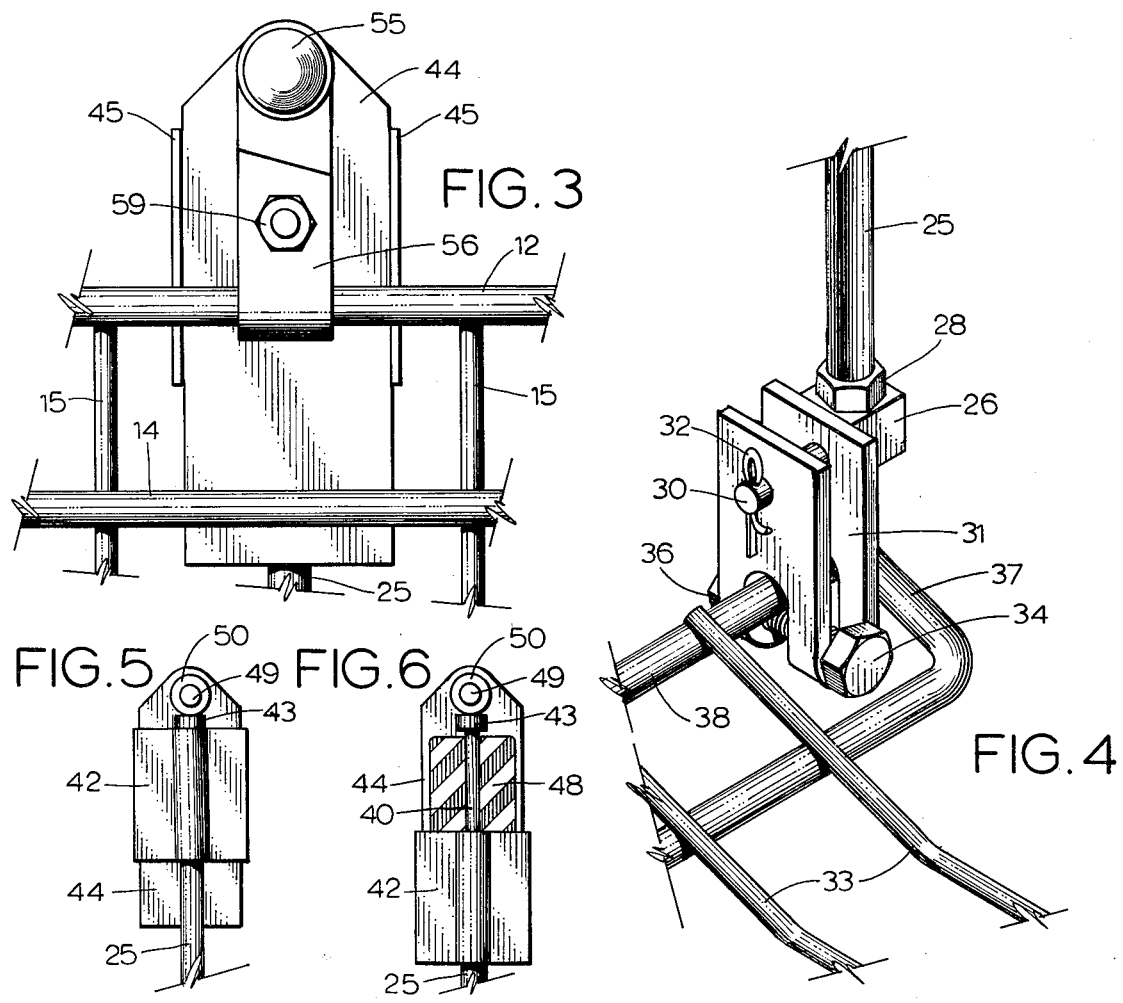

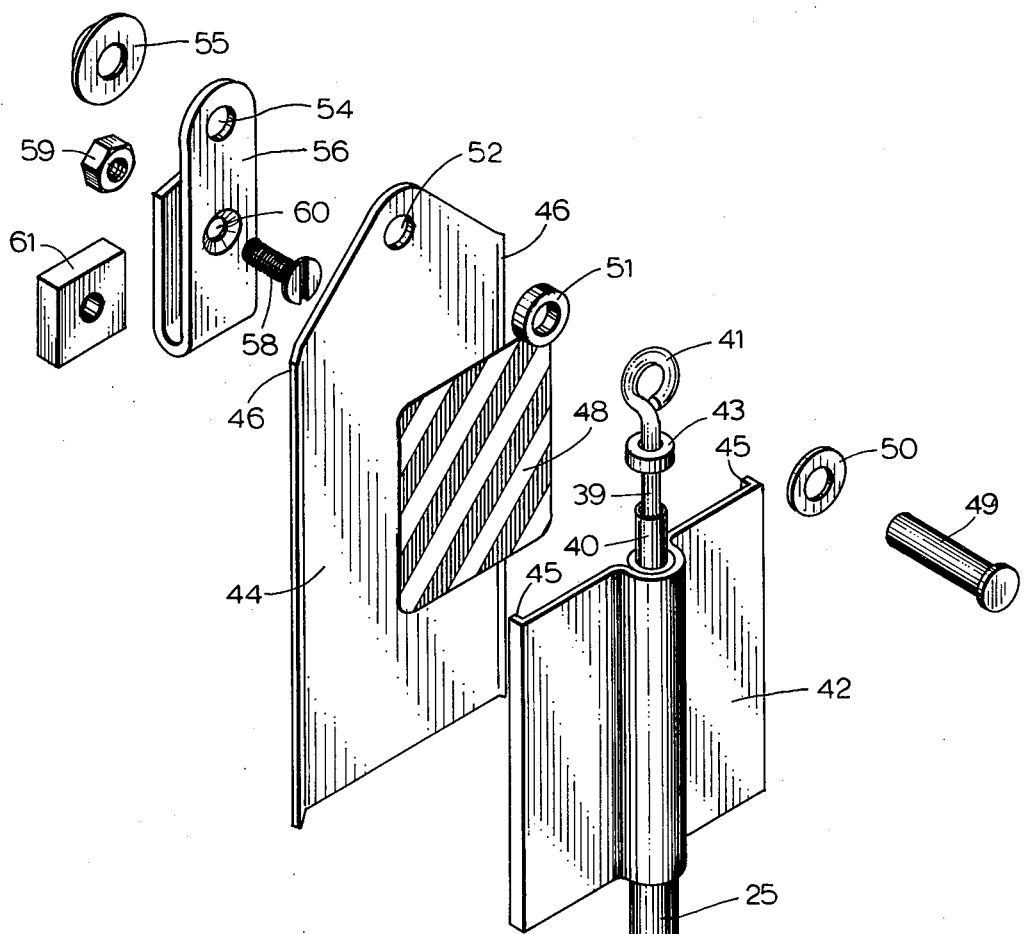
FIG. 2
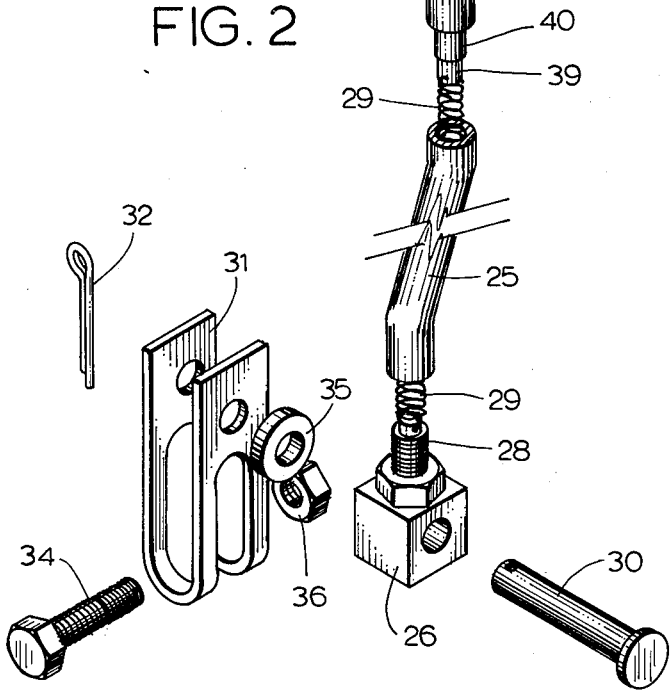

SHOPPING CART WITH LOWER TRAY SIGNALLING DEVICE

BACKGROUND OF THE INVENTION

The present invention relates generally to an improved shopping cart and more particularly to a shopping cart having a signalling device for signalling the presence of a load on the lower tray or shelf.

One problem which grocery stores, discount stores, etc. have experienced throughout the years, particularly stores where the customers are allowed to wheel the shopping cart out into the parking lot with the merchandise or groceries he or she has purchased, is the failure to charge the customer for items placed on the lower tray or shelf of the shopping cart. These items are often missed by the checkout clerk since his or her view of the lower tray is often obstructed as the cart is pushed through the checkout aisle. It has been found that even if the checkout clerk is told to specifically check each cart to make sure that there are no items on the lower shelf which have not been accounted for, he or she often forgets to do this, particularly during busy hours. As a result, the shopping cart is pushed through the checkout station and then either wheeled out to the parking lot and unloaded by the customer or by a carry out person on the assumption that the items have been paid for.

This problem has previously been recognized by others. For example, U.S. Pat. No. 2,918,294 granted to Hennion discloses a shopping cart with means for indicating when the lower tray or basket is loaded with merchandise. This device includes an indicating means connected with the basket portion of the cart and a cable element which is connected with a portion of the cart frame and is movable between an upper and a lower position in response to a portion of the movement of the lower tray about a forward pivot point. In this device, there is no direct connection between the cable and the lower tray. Rather, these two elements operate independently of one another. Thus, two spring members are necessary: one spring to retain the lower tray in a normally raised position and a second spring to maintain the cable element in a normally raised position. This results in a structure which is quite complicated and is not readily adaptable as a retrofit item to shopping carts already in existence.

U.S. Pat. No. 3,051,936 granted to Finger et al. discloses an alarm system for a shopping cart. This alarm indicates the presence of a load on the lower shelf of the cart by completing a circuit when the cart is wheeled through the checkout aisle. This device is also quite complicated structurally and is also not readily adaptable to shopping carts which are already in existence. Further, it requires the installation of contact strips in the checkout aisles to facilitate completion of the electrical circuit, an installation which is unattractive and also expensive.

Although others have recognized the problem resulting from the failure to account for and charge customers for items placed on the lower shelf of shopping carts, the devices described in the prior art have not eliminated the problem. These devices may function satisfactorily in certain applications, however, they appear to have limitations. For example, both are relatively complicated structures which appear to be designed for a special type of shopping cart with limited flexibility to be retrofitted with respect to shopping carts already in use. Accordingly, a need continues to exist for a shopping cart with an improved device for signalling the presence of a load on the lower shelf of the cart which is simple in construction, which is unobtrusive to the customer and which can be easily retrofitted with respect to shopping carts presently in use.

SUMMARY OF THE INVENTION

In contrast to the prior art, the present invention provides a shopping cart with an improved means for signalling the presence of the load on the lower tray of the cart. This means is embodied in a relatively uncomplicated structure and is capable of quick and efficient retrofitting with respect to existing shopping carts.

More specifically, the shopping cart of the present invention includes a frame, an upper basket secured to and supported by the frame and a lower tray positioned below the basket and being pivotally secured near one of its ends to a lower frame member. This pivotal connection permits pivotal movement of the lower tray between a lower position in which the tray rests on a portion of the cart frame and an upper position. The cart also includes improved signalling means for indicating the presence of a load on the lower tray. This signalling means includes an elongated rigid member having its lower end secured to the lower tray at a point spaced from the pivotal connection. This rigid member is movable with the lower tray between a first position corresponding to the lower position of the tray. A second member of the signalling means is secured to a portion of the upper basket or the frame and includes a portion which is slideably connected with the upper end of the rigid member. In the preferred embodiment, this second member includes a signal portion which indicates the presence of a load on the lower tray when it is exposed. The upper end of the rigid member includes a portion which covers the signal portion when the tray is in its raised position and exposes the signal portion when the tray includes a load and is in its lower position. The signalling device also includes a means in the form of a spring member positioned within the rigid member for maintaining the rigid member and the lower tray in an upper position when no load is on the lower tray.

Accordingly, an object of the present invention is to provide an improved shopping cart with a signalling means for signalling the presence of a load on the lower tray of the cart.

Another object of the present invention is to provide a shopping cart with a means for signalling a load on the lower tray of the cart which includes a rigid member having one end directly connected with a portion of the lower tray and the other end associated with a signalling portion of a member affixed to the basket portion of the cart.

Another object of the present invention is to provide a signalling means which can be easily and efficiently retrofitted with respect to existing shopping carts for signalling a load on the lower tray of the cart.

Another object of the present invention is to provide a shopping cart with a means for signalling the presence of a load on the lower tray of the cart which utilizes a single spring for maintaining the tray and the elongated member connected therewith in an upper position.

These and other objects of the present invention will become apparent with reference to the drawings, the description of the preferred embodiment and the appended claims.

DESCRIPTION OF THE DRAWINGS

FIG. 1 is a side elevational view of a shopping cart in accordance with the present invention embodying an improved signalling means for indicating the presence of a load on the lower tray of the cart.

FIG. 2 is a pictorial, broken apart view showing the various structural components of the signalling means of the present invention.

FIG. 3 is an elevational view from the inside of the basket portion of a shopping cart showing the connection of the upper end of the signalling means with the basket portion.

FIG. 4 is a pictorial view showing the connection between the lower end of the elongated rigid member of the signalling means and the lower tray.

FIG. 5 is an elevational view of the upper end of the signalling means with the signal portion being covered.

FIG. 6 is an elevational view, similar to FIG. 5, with the signal portion exposed, thus indicating the presence of a load on the lower tray of the shopping cart.

DESCRIPTION OF THE PREFERRED EMBODIMENT

Reference is first made to FIG. 1 showing a shopping cart designated generally by the reference numeral 10 with the signalling means of the present invention connected to it. The shopping cart 10 includes a plurality of elongated frame members including a bottom frame member 19, a rearward, generally vertically extending frame member 16 and an intermediate, generally vertically extending frame member 22. A handle is connected with the frame member 16 for pushing the cart. The cart 10 also includes an upper basket 11 secured to and supported by portions of the frame members 16 and 22. The basket is constructed of a plurality of spaced, generally horizontally disposed wire members 14 and a plurality of generally vertically disposed wire members 15 interconnected with the members 14. A top wire frame member 12 defines the upper edge of the basket 11. The entire shopping cart is supported by four caster wheel assemblies which are connected with the frame member 19. Only two of the caster wheel assemblies are illustrated in FIG. 1. Each of these assemblies includes a pivotal caster element 20 and a rotatably mounted wheel 21.

The shopping cart 10 also includes a lower tray or shelf 24 which is pivotally secured near one of its ends to the frame member 19. In the preferred embodiment, the lower tray or shelf 24 is pivotally secured at the point 25 near its forward end. As illustrated best in FIG. 4, the lower tray includes a plurality of wire elements 33 which are connected to a heavier wire frame member 38 positioned at the rearward end of the lower tray opposite the pivot point. This heavier frame member 38 includes a portion 37 extending outwardly from the outermost wire element 33 so that downward pivotal movement of the lower tray 24 about the pivot point 25 results in engagement between the portion 37 and a portion of the lower frame 19 to support a load on the lower tray 24.

The present invention also includes a signalling means connected with the shopping cart 10 to indicate the presence of a load on the lower tray 24. As illustrated best in FIGS. 1, 2, 3 and 4, this signalling means includes an elongated hollow rigid tubular member which is directly connected as its lower end to the lower tray. As shown in FIG. 1, this connection with the tray 24 is at a point spaced from the point 25 at which the lower tray is pivotally secured to the frame member 19. The connection between the lower end of the rigid member 25 and the tray 24 is accomplished via the connecting block 26 and the clevis member 31. The connecting block 26 is secured to a threaded member 28 which in turn is threadedly received by internal threads on the inside of the hollow rigid member 25. The connecting block 26 is connected with the clevis 31 by the pin 30. As shown best in FIGS. 2 and 4, the pin 30 extends through an opening in the connecting block 26 and then through corresponding openings in the clevis 31. A cotter pin 32 extends through a hole in the end of the pin 30 to retain the pin in this position. A spacing member 35 is positioned between the connecting block 36 and the clevis 31 to permit free pivotal movement between the block 26 and the clevis 31. As illustrated in FIG. 4, the clevis 31 is connected with a portion of the heavier frame member 38 of the lower tray 24. This is accomplished by positioning a portion of the frame member 38 between a pair of spaced leg portions of the clevis 31 and retaining the same in that position by the threaded bolt 34 and the nut 36.

The hollow rigid member 25 extends upwardly from the lower tray 24 toward the basket 11 (FIG. 1). The upper end of the rigid member 25 is slideably connected with a second elongated rigid member or rod 39 which terminates in a loop 41 at its upper end. The elongated rod 39 extends into the hollow tubular member 25 and is connected at its lower end to an elongated extension spring 29. The other end of the extension spring 29 is connected with the threaded member 28 which in turn is threadedly secured to the member 25. A signal portion in the form of the sleeve section 40 surrounds an upper portion of the elongated rod member 39 and likewise extends into the hollow tubular member 25. In the preferred embodiment, this sleeve section 40 is constructed of a colored plastic or the like to serve as a signal, when exposed, to indicate the presence of a load on the lower tray 24. A spacing ring 43 is disposed near the top end of the member 39 above the sleeve 40 to prevent interference between the top edge of the member 25 and the loop 41. The rod 39 is pivotally secured to a clamp 56 via the pin 49. The pin extends through the loop portion 41, through an opening 54 in the clamp 56 and then is retained by the wedge nut 55. A pair of washer members 50 and 51 are disposed on opposite sides of the loop member 41 to permit free pivotal movement of the member 39 with respect to the pin 49.

The preferred embodiment also includes a plate member 44 with a hole 52 at its upper end through which the pin 49 extends and a corresponding plate member 42 connected with a portion of the rigid member 25. The plate member 44 includes a pair of side edges 46, 46 which are beveled slightly as shown in FIG. 2. The plate member 42 includes a pair of side edges 45, 45 which are spaced so that one of the edges 45, 45 is disposed on each side of the plate member 44 when the device is assembled. The plate member 44 also includes an additional signalling portion 48 in the form of a colored flag or the like. This portion 48 is secured to a face of the plate 44 and is positioned so that it is covered by the plate 42 when the rigid member 45 is in its upper position and is exposed when the rigid member 25, and thus the plate 42, is in its lower position.

As illustrated best with reference to FIGS. 2 and 3, the clamp member 56, and thus the rod member 39 and the plate 44, is connected with respect to the top wire frame member 12 of the basket portion 11. The clamp 56 includes a U-shaped portion with a pair of legs straddling the top frame element 12. As illustrated in FIG. 2, a generally rectangular element 61 is disposed between the leg portions of the U-shaped clamp 56 and the entire clamp 56 is secured in this position to the wire 12 by the threaded member 58 extending through the opening 60 in the clamp 56 and a corresponding opening in the member 61. The threaded member 58 is retained by the nut 59. With this connection the rod member 39 and plate 44 are pivotally secured to the basket portion 11 of the shopping cart 10 (FIG. 1).

Having described the structure of the present invention, the operation can be described as follows. In its normal, unloaded position, the shopping cart 10 is in the position illustrated in FIG. 1 and the signalling means is in the position illustrated in FIG. 5. In this position, the lower tray 24 is in its raised position and is maintained in that position as a result of the spring member 29 disposed within the hollow rigid member 25. As previously described, one end of the spring 29 is connected to a portion of the member 25 and the other end is connected with the lower end of the rod 39. The rod 39 in turn is pivotally secured to a portion of the shopping cart basket 11. With this structure, the lower tray 24 and the member 25 are maintained and biased in their upper position (as illustrated in FIGS. 1 and 5) by the spring 29. The spring 29 should be sufficiently strong to maintain the tray 24 and the member 25 in this position; however, it should also be flexible enough to permit downward movement of the lower tray 24 when a load is placed on the tray 24. When the tray 24 is in the position illustrated in FIG. 1, the relationship between the corresponding plate members 42 and 44 and the sleeve and rigid members 40 and 25 are as illustrated in FIG. 5. Specifically, the signalling portion of the sleeve 40 is covered by the tubular member 25 and the flag 48 is covered by the plate 42.

When a customer places a load on the lower tray 24, the lower tray 24 pivots downwardly about its pivot 25 against the force of the spring 29. This downward pivotal movement results in corresponding downward movement of the rigid member 25 because of the direct connection between the member 25 and the tray 24. As illustrated in FIG. 6, this downward movement of the member 25 exposes the signal portion of the sleeve 40 and also results in corresponding downward movement of the plate member 42 to expose the flag 48 on the surface of the plate 44. Thus, when the checkout clerk notices exposure of the signalling portion such as the sleeve 40 or the flag 48, he or she knows that merchandise has been placed on the lower tray and the same can be accounted for.

Although the description of the preferred embodiment has been quite specific, it is contemplated that various modifications could be made without deviating from the spirit of the present invention. Accordingly it is intended that the scope of the present invention be dictated by the appended claims rather than by the description of the preferred embodiment.

I claim:

1. A shopping cart comprising:
a frame;
an upper basket secured to and supported by said frame;
a lower tray positioned below said basket and being pivotally secured near one end to said frame to permit pivotal movement of said lower tray between a first or upper position and a second or lower position; and
signalling means for indicating the presence of a load on said lower tray including:
a first elongated rigid member being hollow and having its lower end directly connected with said lower tray at a point spaced from the point at which said lower tray is pivotally secured to said frame and being movable with said lower tray between a first position corresponding to the first position of said lower tray and a second position corresponding to the second position of said lower tray;
a second member secured to a portion of said upper basket or frame and having a portion slideably connected with the upper end of said first elongated rigid member, one of said first elongated rigid member and said second member including a signal portion for indicating the presence of a load on said lower tray when exposed and the other of said first elongated rigid member and said second member including means for covering said signal portion when said first elongated rigid member is in its first position and exposing said signal portion when said first elongated rigid member is in its second position, said second member further including a second elongated rigid member extending within said first elongated rigid member;
means for maintaining said lower tray in its first position in the absence of a load and for permitting movement of said lower tray to said second position when a load is placed on said lower tray including a spring disposed within said first elongated rigid member and extending between the lower end of said second elongated member and a portion of said first elongated rigid member.

2. The shopping cart of claim 1 wherein the upper end of said second elongated member includes a signal portion which is covered by a portion of said first elongated rigid member when said first elongated rigid member is in its first position and which is exposed when said first elongated rigid member is in its second position.

3. The shopping cart of claim 2 wherein said signal portion is disposed within said first elongated rigid member when said first elongated member is in its first position.

4. The shopping cart of claim 3 wherein said second member is pivotally secured to a portion of said upper basket.

5. The shopping cart of claim 2 wherein the upper end of said first elongated rigid member includes a first plate and the upper end of said second elongated member includes a second plate having a said signal portion such that said signal portion is covered by said first plate when said first elongated rigid member is in its first position and said signal portion is exposed when said first elongated rigid member is in its second position.

6. The shopping cart of claim 4 wherein said second elongated member is a rigid member.

7. A signalling device for signalling the presence of a load on the lower tray of a shopping cart of the type having a frame, an upper basket secured to and supported by the frame and a lower tray pivotally secured near one end to the frame, said signalling device comprising:

a first elongated rigid member being hollow and having its lower end adapted for direct connection with said lower tray at a point spaced from the point at which said lower tray is pivotally secured to said frame and being movable with said lower tray between a first position corresponding to the first position of said lower tray and a second position corresponding to the second position of said lower tray;

a second member adapted for connection with a portion of said upper basket or frame and having a portion slideably connected with the upper end of said first elongated rigid member, one of said first elongated rigid member and said second member including a signal portion for indicating the presence of a load on said lower tray when exposed and the other of said first elongated rigid member and said second member including means for covering said signal portion when said first elongated rigid member is in its first position and exposing said signal portion when said first elongated rigid member is in its second position, said second member further including a second elongated rigid member extending within said first elongated rigid member;

means for maintaining said lower tray in its first position in the absence of a load and for permitting movement of said lower tray to said second position when a load is placed on said lower tray including a spring disposed within said first elongated rigid member and extending between the lower end of said second elongated member and a portion of said first elongated rigid member.

8. The signalling device of claim 7 wherein the upper end of said second elongated member includes a signal portion which is covered by a portion of said first elongated rigid member when said first elongated rigid member is in its first position and which is ezposed when said first elongated rigid member is in its second position.

9. The signalling device of claim 8 wherein said signal portion is disposed within said first elongated rigid member when said first elongated member is in its first position.

10. The signalling device of claim 8 wherein the upper end of said first elongated rigid member includes a first plate and the upper end of said second elongated member includes a second plate having a said signal portion such that said signal portion is covered by said first plate when said first elongated rigid member is in its first position and said signal portion is exposed when said first elongated rigid member is in its second position.

* * * * *